STORAGE APPARATUS

Filed Oct. 23, 1961 10 Sheets-Sheet 1

INVENTOR

ROGER BAJULAZ

BY Irwin S. Thompson

ATTY.

INVENTOR
ROGER BAJULAZ
By Irwin S. Thompson
ATTY.

INVENTOR
ROGER BAJULAZ
By Irwin S. Thompson
ATTY.

INVENTOR
ROGER BAJULAZ
By Irwin S. Thompson
ATTY

Sept. 7, 1965 R. BAJULAZ 3,204,785

STORAGE APPARATUS

Filed Oct. 23, 1961 10 Sheets-Sheet 5

INVENTOR
ROGER BAJULAZ
By Irwin S. Thompson
ATTY.

INVENTOR
ROGER BAJULAZ
By Irwin S. Thompson
ATTY.

INVENTOR
ROGER BAJULAZ
BY Irwin S. Thompson
ATTY.

STORAGE APPARATUS

Filed Oct. 23, 1961 10 Sheets-Sheet 8

INVENTOR
ROGER BAJULAZ
By Irwin S. Thompson
ATTY.

Sept. 7, 1965 R. BAJULAZ 3,204,785

STORAGE APPARATUS

Filed Oct. 23, 1961 10 Sheets-Sheet 9

INVENTOR

ROGER BAJULAZ

By Irwin S. Thompson

ATTY.

Sept. 7, 1965

R. BAJULAZ 3,204,785

STORAGE APPARATUS

Filed Oct. 23, 1961

10 Sheets-Sheet 10

INVENTOR

ROGER BAJULAZ

By Irwin S. Thompson

ATTY.

United States Patent Office 3,204,785

Patented Sept. 7, 1965

3,204,785
STORAGE APPARATUS

Roger Bajulaz, 13 Chemin Pierre Grise, Genthod, Geneva, Switzerland

Filed Oct. 23, 1961, Ser. No. 146,872
Claims priority, application Switzerland, Nov. 4, 1960, 12,357/60; Sept. 6, 1961, 10,329/61
8 Claims. (Cl. 214—16.1)

There does actually exist numerous methods of storing especially for the storage of automobile vehicles for tourism as well as different installations for carrying these methods into effect. However, all the realizations proposed and realized this day present drawbacks the principal of which are:

(1) The area that has to be foreseen for the number of automobile cars to be parked is very great. The encumbrance of the whole installation becomes very important and necessitates large scale constructions. These installations present very often an inacceptable encumbrance and a very high net cost.

(2) The time necessary for the parking and storage of an automobile car, as well as the time necessary to obtain this parked car is much too long and does not provide economical parking or withdrawal demands during the busy hours. This situation creates conjectures and more often than not, requires the car driveds to long waiting periods.

The present invention has for its object a parking method, especially for the storage of automobile vehicles, tending to remedy the above mentioned drawbacks by placing a load forward on a toothed platform which is part of a setting device, displacing toothed supports which are part of a storing device, along a rollway in order to bring one of these in setting position, displacing then the toothed platform vertically and setting the load on the toothed support in setting position by passage of the toothed platform of the setting device through the toothed support and by inversing the above steps withdrawing the load.

The present invention has also for its object an installation for the carrying into effect of the method comprising a setting device and a storing device wherein the storing device comprises on the one hand at least one rollway and on the other hand at least one toothed support displaceable along said rollway, the setting device comprises an elevator located on the tracing of the rollway comprising at least one platform constituted by at least one toothed element and located in working position in the inside of the rollway whereas all the mechanism of the elevator is located outside of the rollway and that the arms of each platform element goes through the rollway in the course of their displacement, the whole being arranged so that the platform elements of the elevator pass in the course of their downward and upward movements through one of said supports, lolated in setting position, of the storing device.

The attached drawings illustrate schematically and by way of example three embodiments of the installation for the carrying into effect of the method according to the invention.

Figure 1:
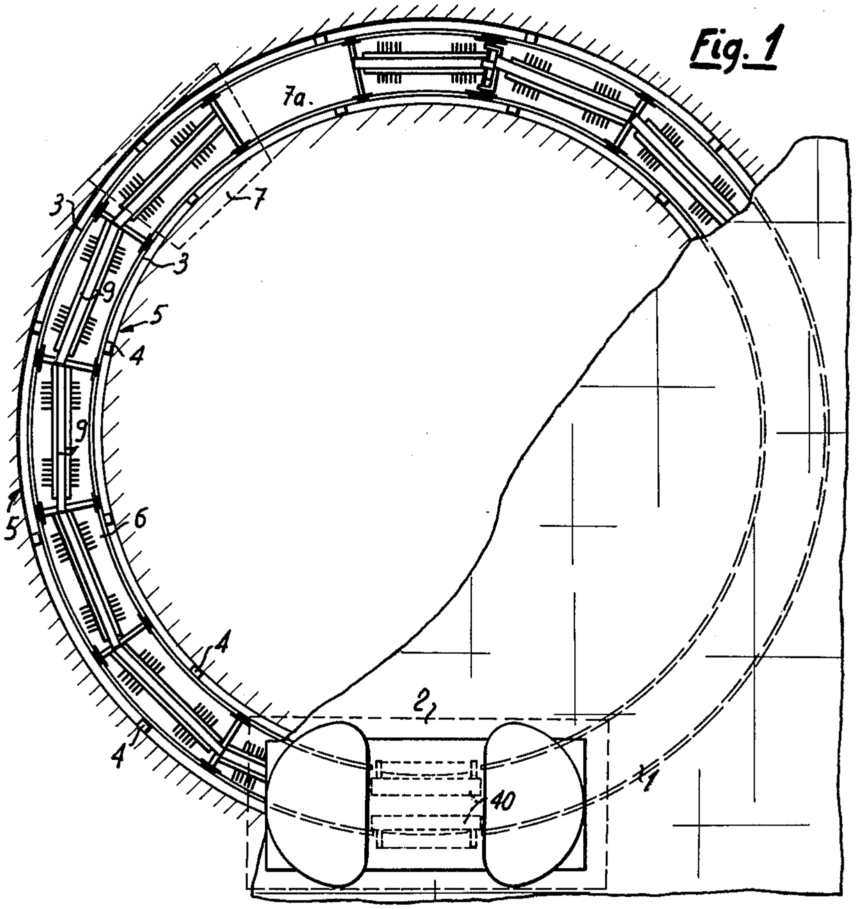
FIG. 1 is a schematic plan view of a first embodiment of the storing installation.

With reference to FIGS. 1 to 9, the first embodiment of the installation comprises a storing device 1 and a setting device 2.

The storing device 1 of the automobile vehicles comprises closed circuits formed by interrupted rollways constituted for example by rails 3 of circular shape fixed on beams 4 sealed in the walls 5 of a circular trench 6.

A line of carriages 7 hinged with respect to each other is disposed on the rollway and is adapted to roll along it. The periphery of the closed circuit formed by the rollway is such that it is adapted to receive a whole number of carriages 7. Each carriage 7 comprises a driving axle 8, two toothed supports 9 and a coupling member 10 pivoted on the shaft 8 of the preceding carriage 7. Each toothed support 9 presents the general shape of a comb the teeth of which extend in the direction of the rail 3 and the extreme teeth 11 of which show a greater height than the intermediate teeth 12. These intermediate teeth present at their free extremity an abutment 13 of same height as the extreme teeth 11.

The number of carriages 7 of a line of carriages is equal to the maximum possible number less one. In this way, one creates a free space *7a* between the first and the last carriage 7 the length of which is equal to one of the carriages 7.

Figures 5, 6, 7, 8:
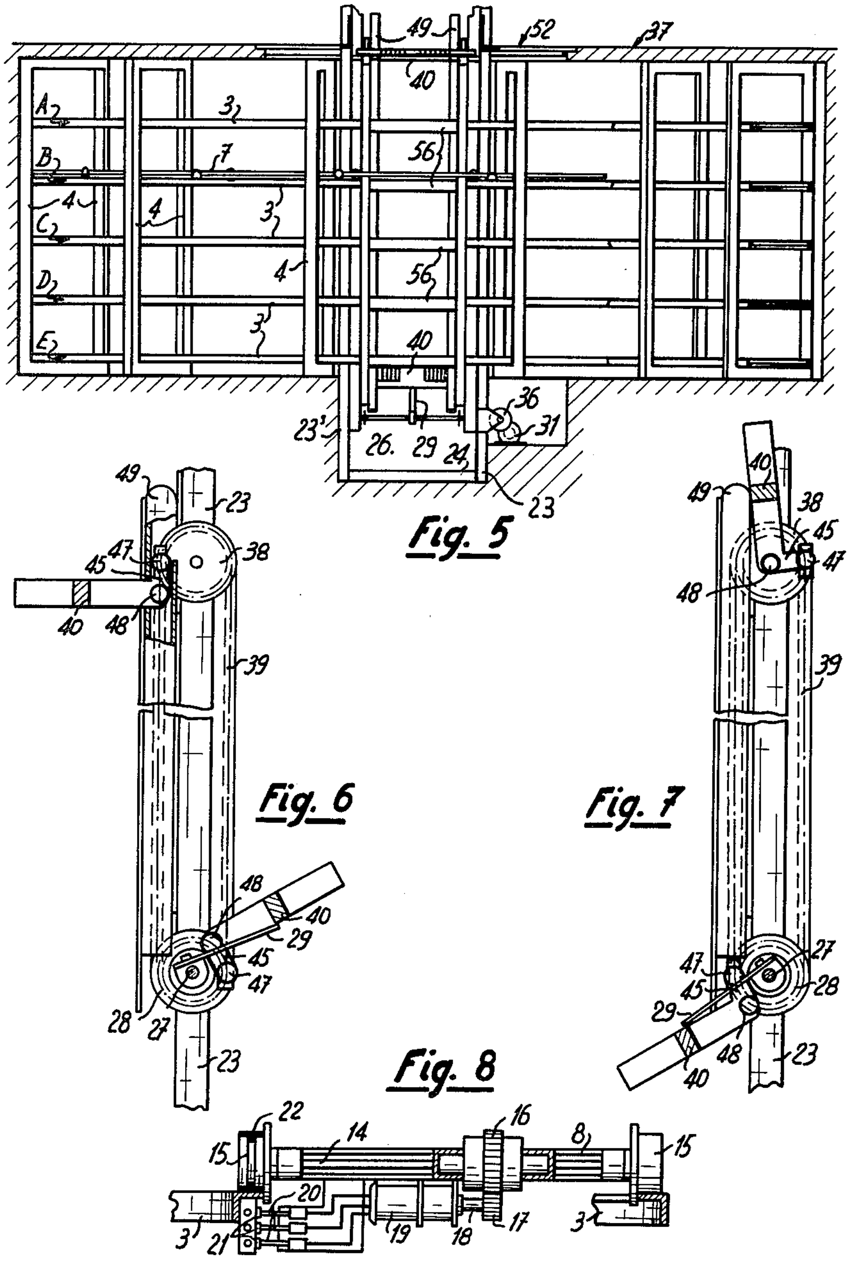
FIG. 5 is a schematic view in elevation of the installation illustrated in FIG. 1.
FIGS. 6 and 7 are partial views of the setting device, this one being in two different positions.
FIG. 8 is a detail illustrating a type of driving means for the supports of the storing device.
Figure 9:
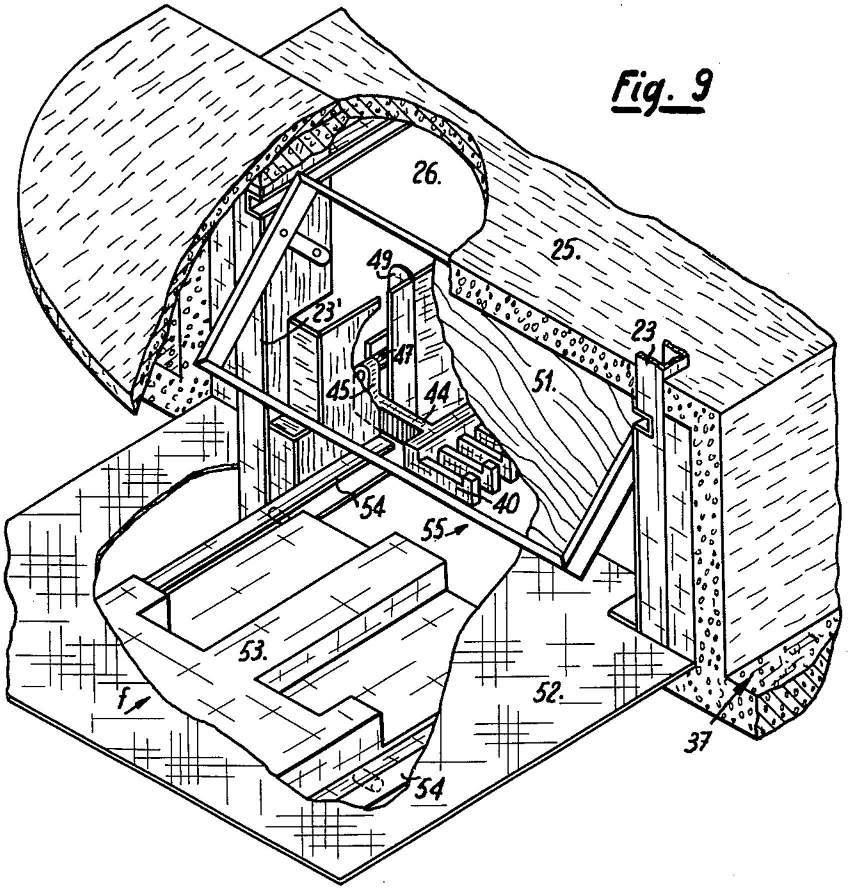
FIG. 9 is a perspective view of the access to the setting device.

One of the carriages 7 comprises a driving axle 8, illustrated at FIG. 8. This driving axle comprises a driving shaft 14 disposed in axle 8 and driving the wheels 15 in rotation. This driving shaft 14 is fast with a toothed wheel 16 meshing with a pinion 17 fixed on the shaft 18 of a motor 19 fixed on the axle 8.

In the example shown, the motor 19 is a three-phase electric motor fed by three shoes 20. Each of these shoes 20 is in contact with a feeding rail 21 fixed on one of the rails 3 of the rollway. The feeding rails are mounted in an insulation member so as to be electrically insulated with respect to each other. The wheels 15 of this driving axle 8 are provided with a non-slipping coating 22.

The rails 3 of the rollways are interrupted on a distance corresponding to the length of the setting device 2, this one being inserted in the periphery formed by the corresponding closed circuit. This distance is partially filled by means of rolling surfaces carried by the setting device.

The storing device comprises several closed circuits equipped in the way described herebefore and disposed the one under the other in the trench 6. The distance between each of these closed circuits is sufficient to easily enable the placing of automobile cars of current dimensions on the toothed supports 9 of the carriages 7. FIG.

5 illustrates one example comprising five closed circuits disposed one above or under the others.

The length of a carriage 7 is not the same at all floors. Certain floors, for example the two upper floors, are provided with long carriages which may receive long cars, for example American cars, whereas the three lower floors are provided with short carriages intended to receive smaller cars, for example European cars. In this way, one increases substantially the storing capacity of the installation for a given situation.

The setting device 2 comprises an elevator located on the axis of the closed circuits. This elevator comprises four bearing columns 23, 23', the lower ends of which are connected together by means of a frame 24 sealed in the ground, whereas the upper ends of these bearing columns 23, 23', are lodged in a concrete overhead 25 constituting the deck of the housing 26 in which the setting device 2 is lodged.

Shafts 27, 27' provided at the proximity of their extremities with wheels, for example chain wheels 28, are pivoted through their ends in bearings provided in the bearing columns 23, 23' near their lower extremities. An arm 29 is fixed on each of these shafts 27, 27' approximately in their middle. One of the ends of the shafts 27, 27' goes through one of the columns 23, 23' respectively and carries a bevel pinion 30.

An electric motor 31 rigidly fixed on the ground of the housing 26 actuates, through the intermediary of gears 32, 33 a driving shaft 34 which is pivoted on two flanges 35 fast with one of the columns 23, 23' respectively. Each end of this driving shaft 34 carries a bevel pinion 36 in mesh with the bevel pinion 30 carried by the shaft 27 and 27' respectively.

Approximately at ground level 37, chain wheels 38 are pivoted in bearings provided in the bearing columns 23, 23'. Each of these chain wheels 38 is located in the alignment of the chain wheel 28 carried by the same bearing columns 23, 23'.

Supple members constituted for example by endless chains 39, 39' are stretched between the chain wheels 28 and 38 of each bearing columns 23, 23', respectively.

This elevator comprises further two platforms each constituted by two toothed elements 40 presenting the general shape of a comb the teeth 42 of which extend, in working position, in the direction of the longitudinal middle axis of the elevator. Each of these toothed elements 40 comprises two mounting arms 44 comprising at their free ends a part 45 disposed at right angles to the platform of the elevator. The toothed elements 40 are fixed through the intermediary of these parts 45 and of pieces 46 showing the general shape of a U on two chains 39, 39' respectively. One of the wings of each of these pieces 46 is fixed to a chain by means of two successive hinging axles of said chain. Each of the parts 45 of the toothed elements 40 comprises further two rollers 47, 48 intended to cooperate, during the lowering of the platform, with guide channels 49, rigidly fixed on the bearing columns. The two platforms each formed by two toothed elements 40 are fixed on the chains 39, 39', so that when one platform is located in its high position, that is to say approximately at level 37, the other platform is located in a low position, that is to say at approximately the bottom of the housing 26. For the latter position, the platform is however not horizontal.

The shape of the toothed element 40 is such that it is possible to coincide their teeth 42 with the spaces between the teeth of a support 9.

The elevator presents further rolling surfaces 56 fixed on the guide channels 49 and located in a same horizontal plane as the rails 3 and also in the prolongation of those, so as to form the closed circuit, still leaving passages for the mounting arms 44.

The gap of the elevator shaftway is partially filled by means of these rolling surfaces 56. The gaps existing between the rails 3 and the rolling surfaces 56 are sufficient to give passage to the arms 44 of the elevator's platform 40 but are much less than the diameter of the rolls 15 of the carriages. Further, thanks to the curvature of the railway the four rollers of one carriage are never simultaneously above one of said small gaps. Therefore the rollers 15 may easily cross the interruption of the railway 3.

This elevator is thus constituted in such a way that all the mechanism, bearing columns, guide channels, chains and their driving mechanism, is located on the lateral sides of the rollways, that is at the outside of the rails 3, whereas only the elements 40, placed in working position, are located in the inside of these rollways, that is between the rails 3. On the other hand, the closed circuits are interrupted in very little distances only, slightly greater than the width of the arms 44 of the toothed elements 40. Further the distance between the two arms 44 of a toothed element 40 is less than the one separating two axles 8 and the interruptions of the rollway being not radial, there is never more than one wheel of a carriage in front of an interruption at a given instant.

The operation of the elevator itself, illustrated in FIGS. 6 and 7, is according to the following.

In rest position of the storing installation, the elevator is stopped in the position illustrated in FIG. 6. In that position, one of the platforms, constituted by two toothed elements 40, only one of which is illustrated, is located in the upper position and is horizontal. These toothed elements 40 are maintained in that horizontal position by means of the rollers 47, 48 engaged in the guides 49. For that rest position of the storing installation, the toothed elements 40 of the second platform of the elevator are located in the position illustrated in the lower portion of FIG. 6.

Upon the setting in operation of the elevator, the first platform, located in the upper position, is driven by the chains and starts its lowering movement. During nearly the totality of the duration of this lowering movement, this platform is maintained in horizontal position, in the way described before. On the other hand, the toothed elements 40 of the second platform are driven in the ascending movement of the other legs of the chains 39, 39' and, during their rotation around the chain wheels 28, they are submitted to the action of the arms 29 which pivot each toothed element 40 around the axis of the roller 47 until an approximately vertical position is reached. This position is defined by the axis of the roller 47 fast with the chain and the resting of the end of the teeth of the toothed element 40 against one of the wings of the guides 49. FIG. 7 illustrates the instant when the toothed element 40 of the first platform starting is rotation around the chain wheels 28 is submitted to the action of the arm 29, whereas the toothed element 40 of the second platform starts, under the action of its own weight and the traction exerted by the chain 39, a pivoting movement around the axis of the roller 47. This pivoting movement continuing, the toothed element 40 comes in horizontal position and is then maintained in this position by the engagement of the rollers 47, 48 in the guides 49.

Upon reversing of the rotation direction of the chains, the ascending platform is maintained in horizontal position, whereas the toothed elements 40 of the other platform are vertical and have a descending movement. The movements of the toothed elements 40 are analogous to those described before, but in the inverse direction. However, in that case, the rotation of the toothed elements 40 around the chain wheels 28 is effected by the combined action of gravity and traction of the chains.

The access of the setting device 2 comprises two inlets having axes in a direction tangent to the rollways and which might be closed by means of tilting doors 51 driven by a motor 57 so that access surfaces 52 are secured. Further, at least one mobile plate 53 slides in slides 54 under the action of a motor (not shown) between an active position for which it closes the aperture 55 of the housing 26 and an inactive position for which it uncovers this aperture 55. This access device is disposed on top of the storing device.

The storing installation comprises further a control device of the necessary successive operations for the parking and storage or withdrawal of an automobile vehicle. This central control device enables an operator to control the energization of the motors; 31 for the driving of the chains, 57 for the actuating of the doors 51, as well as the motor driving the mobile plate 53.

Further, the control device comprises a security device including particularly a locking device positioned relative to the elevator and to the carriage 7 in a charging or withdrawing position of the toothed supports 9 which have to be positioned with precision with respect to the toothed elements 40 of the platform of the elevator, so as to ensure, during the necessary time, the positive holding of this relative position of the toothed supports 9 and the toothed elements 40.

Figure 2:
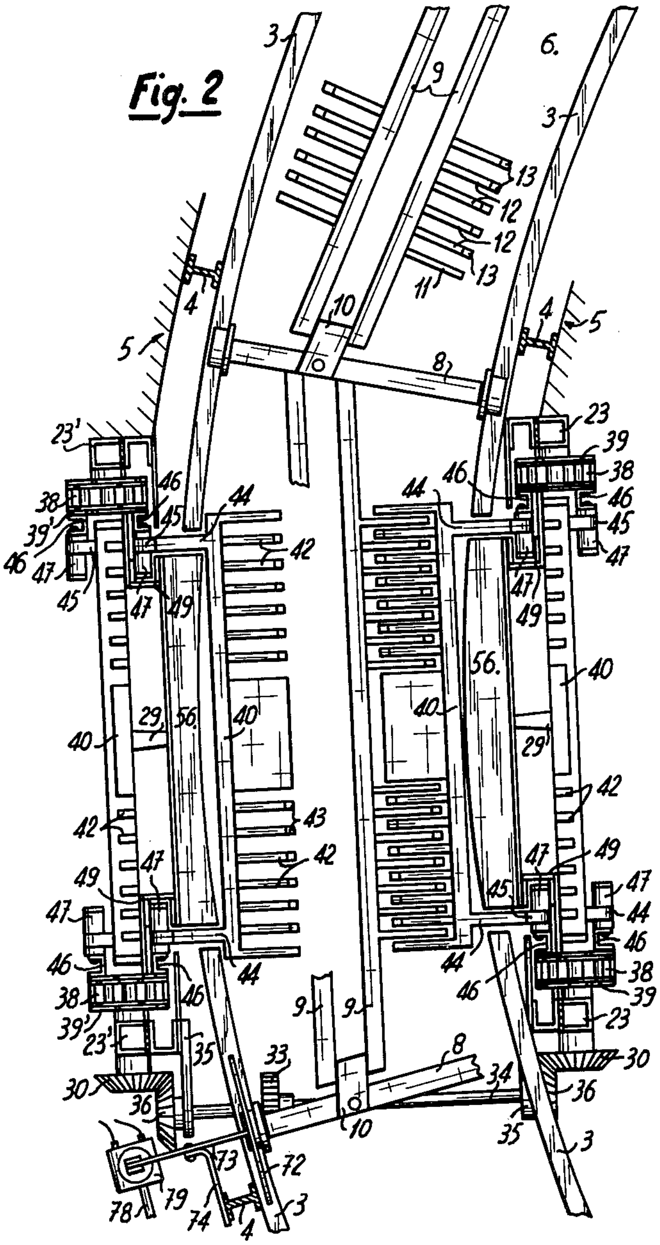
FIG. 2 is a top view of the setting device and of a part of the storing device illustrated in FIGS. 3 and 4.
Figure 3:
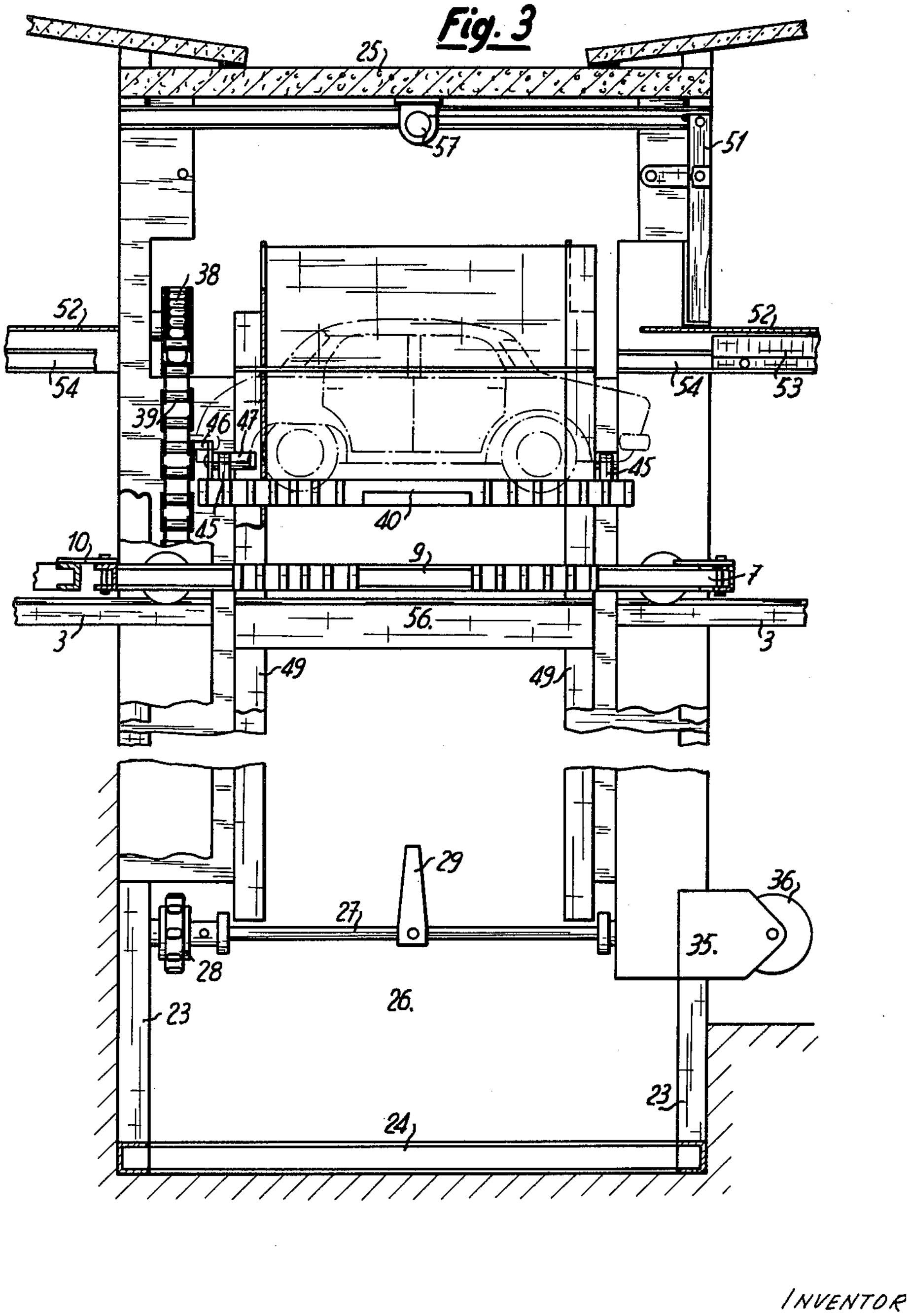
FIG. 3 is a view in side elevation of the setting device.
Figure 4:
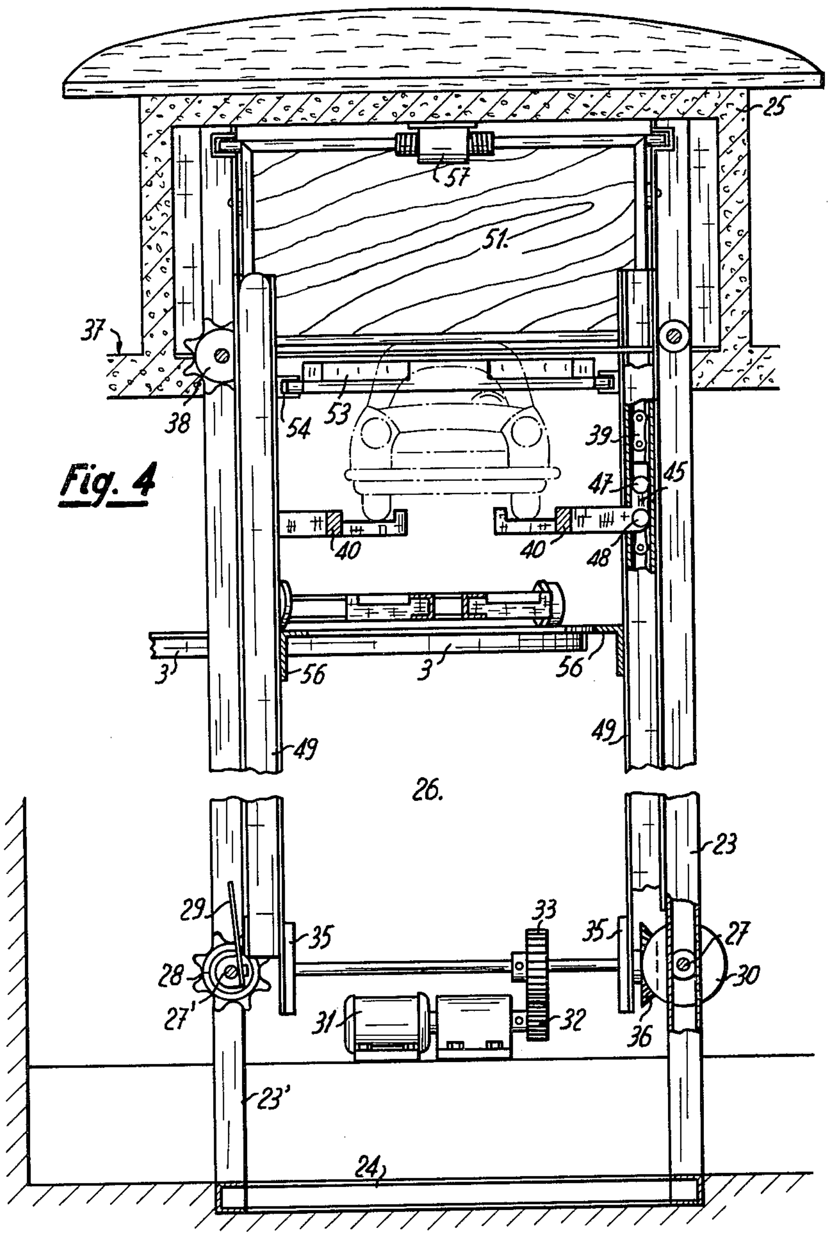
FIG. 4 is a view in front elevation of the setting device.
Figures 10, 11, 12, 13:
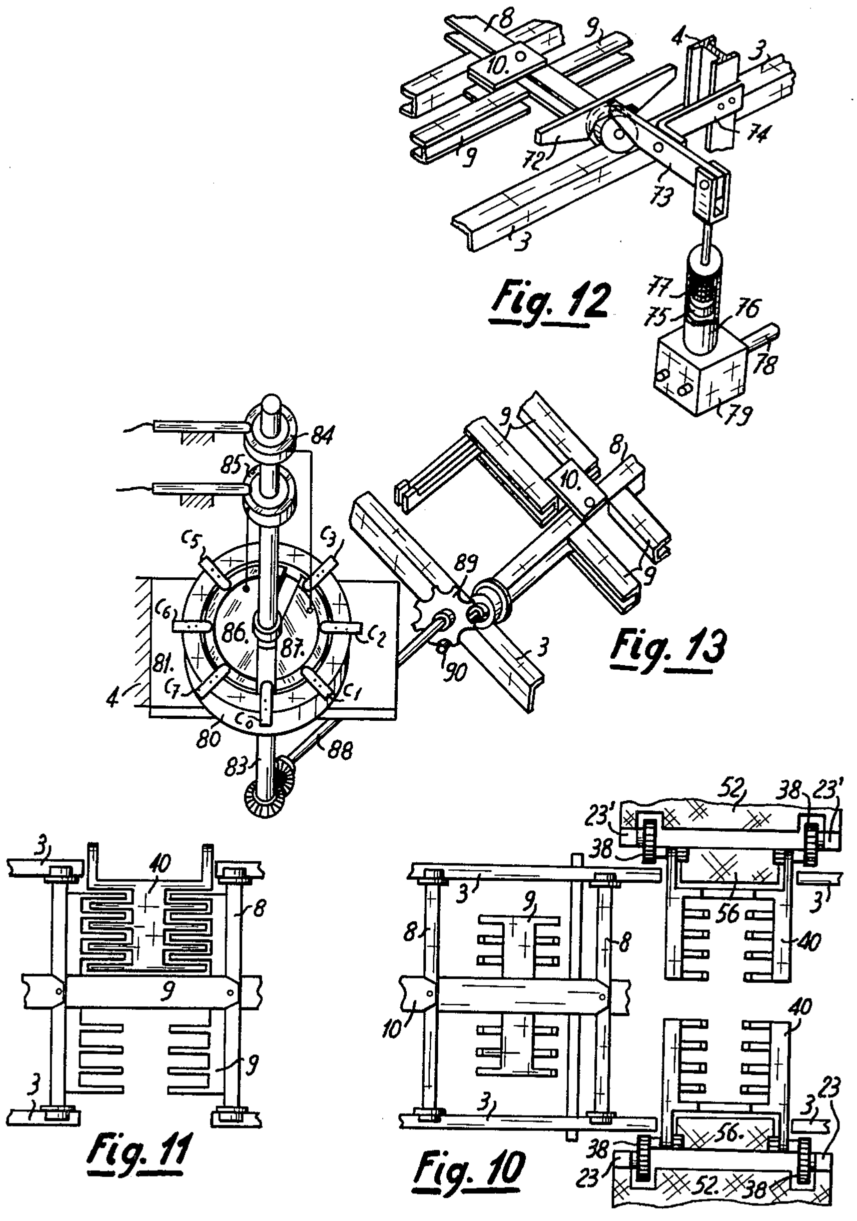
FIGS. 10 and 11 are partial top views of a second embodiment of the installation.
FIG. 12 is a perspective view of the locking device of the carriages of the storing device.
FIG. 13 is a perspective view of the identification and marking device of the carriages of the storing device.

This locking device, illustrated in FIGS. 2 and 12 is constituted by a lock 72 fast with one of the extremities of an oscillating arm 73 pivoted on a support piece 74 rigidly fixed on a beam 4. The other end of the arm 73 is mechanically coupled to a piston 75 sliding in a cylinder 76 and submitted to the action of a return spring 77. A compressed air duct 78 is connected to the cylinder 76 through an electromagnetically operated valve 79. When the valve 79 is in closed or inactive position, a position in which it is when not being fed with electric current, the piston 75 is maintained in rest position by the spring 77. This rest position of the piston corresponds to the locked position of the locking device. In fact, in this position, the lock 72 is located in an upper position, situated at a distance of the rail 3 higher than the height of a wheel of a carriage 7. When a carriage is in setting position, that is to say of charge or withdrawal, the electromagnetic valve 79 is actuated by supplying electric voltage thereto. The compressed air drives the piston 75 against the action of its return spring 77 and the lock 72 comes in contact with a wheel of axle 8 of the carriage 7 located in setting position as shown in FIG. 12. The considered carriage is thus positively held in a setting position.

It is important that the locking is effected on a wheel of the carriage in setting position so that it is maintained in its exact position. In fact, the coupling of the carriages to each other presents certain clearances which are incompatible with the setting precision necessary. In these conditions, it is evident that the setting position of a carriage could not be ensured with a sufficient precision, if the locking would not be done on the carriage itself.

The security device includes further an identification device of the different carriages 7 and of marking of their position with respect to that of the elevator.

Figure 14:
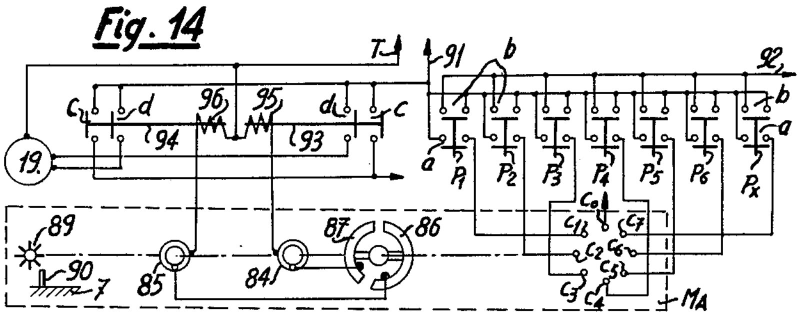
FIG. 14 is an electrical simplified diagram of the marking device.

The identification and marking device of the different carriages 7, illustrated in FIGS. 13 and 14, comprises for each rollway, that is to say for each floor A . . . E on the one hand a series of pushbuttons $P_1$ to $P_x$ the number of which is equal to the number of carriages 7 situated on the corresponding rollway and on the other hand a memory device MA, MB, MC, MD, ME of the actual positions of the carriages 7 or this rollway.

Each of these memory devices MA to ME comprises a fixed part 80 rigidly fastened on a bearing plate 81 solid with the rollway or a beam 4. This fixed part 80 is traversed by a rotor constituted by a shaft 83 carrying two contact rings 84, 85 as well as two conducting sectors 86, 87. This shaft 83 is driven in rotation through the intermediary of bevel gears and of a shaft 88 by a notched wheel 89 co-operating with a pin 90 carried by each of the carriages 7. The number of teeth of said wheel 89 is equal to the number of carriages 7 plus one, placed on the corresponding rollway. In the example shown, the pins 90 are constituted by an extension of the shafts of the axles 8.

The fixed part 80 comprises further a number of contacts $C_0$ and $C_x$ equal to the number of carriages located on the corresponding rollway increased by one unit and angularly equidistant one from the other. The contact $C_0$ corresponds to the free space 7*a* of the considered line of carriage.

Each of the pushbuttons $P_1$ to $P_x$ actuates two contacts *a, b* the ones *a* of which are connected in series between an electric current supply line 91 and the corresponding contact $C_1 \ldots C_x$ of the memory device MA. The other contacts *b* are connected in series between the current supply line 91 and a line 92 connected to all the contacts $C_0$ of all the memories MB to ME, that is to say to the contacts $C_0$ of all the memories but the one of the memory device MA corresponding to the series of pushbuttons $P_1$ to $P_x$.

Each of the conducting sectors 86, 87 is electrically connected to one of the contact rings 85, 84 respectively.

Each of the rings 84, 85 is electrically connected to one of the ends of the excitation coil 95, 96 of a switch 93, 94 respectively. The other ends of these excitation coils 95, 96 are connected to ground T.

Each of the switches 93, 94 comprises two contacts *c, d* the ones *c* of which are connected in parallel and inserted in series in the supply circuit of the electromagnetic valve 79. The other contacts *d* are located in two different supply circuits of the motor 19 of the driving axle 8 of the line of carriages 7. One supply circuit providing its being driven in rotation in one direction while the other supply circuit provides that the motor 19 be driven in the other rotary direction. In the case of a three-phase motor 19, the direction of rotation of the motor is obtained for example by reversing two phases thereof.

The operation of the security device of the storing installation is according to the following:

When the operator wants to place a determined carriage in setting position, he presses on the pushbutton P corresponding to this carriage. The contacts *a* and *b* of this pushbutton P are closed, so that on the one hand the contact C corresponding to the desired carriage is supplied with voltage and that on the other hand, through the intermediary of the line 92, all the contacts $C_0$, but the one of the floor to which belongs the depressed pushbutton P, are also supplied with voltage. This situation provides:

(1) The closure of one of the switches 93, 94 depending upon with which conducting sector 87, 86 that the contact is in connection. This switch closes its contacts *c* and *d* which supplies voltage on the one hand to the electromagnetic valve 79 providing thus the unlocking of the line of carriages 7 in which the desired carriage is located and on the other hand the motor 19 of the driving axle of this line of carriages, which provides the circulation of this line of carriages 7. The direction of rotation of this motor is dependent upon which switch 93 or 94 is actuated. This direction of rotation is chosen so that the desired carriage is brought into a setting position by the shortest route, which enables reducing the time necessary for its setting in setting or charging position. When the desired carriage 7 has arrived in setting position, the contact C corresponding to that carriage, no longer engages the conducting sector 86 or 87 and therefore interrupts the voltage supply of the switch 93 or 94 thereby deenergizing electromagnetic valve 79 and motor 19. In fact, during the movement of the carriages, the rotor of the memory device is driven step by step in rotation, so that its angular position corresponds always to that of the line of carriages 7 along the rails 3.

The motor 19 being deenergized, the line of carriages 7 stops and the desired carriage is locked in position with the aid of the lock applied in active position by the electromagnetic valve 79 closing off the compressed air to piston 75 and spring 77 acting on piston 75 so that lock 72 engages a wheel of the desired carriage.

(2) The contact $C_0$ of all the other floors being suppied with voltage, the corresponding lines of carriages will in a similar way as the one described above displace themselves until their rest position which is the free space $7a$ is located in front of the elevator.

Due to the security device the operator may thus easily bring automatically anyone of the carriages 7 to a setting position and lock this one in said position and simultaneously place all the lines of carriages which do not comprise the chosen carriage 7 in rest position.

The controlled device may be semiautomatic or fully automatic. In this latter case, all the necessary operations for the storage or the withdrawal of a car are made automatically upon order of the operator.

The storing installation comprises further an indication device, visual or not, of the free or occupied carriages 7 of the storing device.

For a given carriage, located in setting position, it is possible to obtain with the aid of the direction of displacement of the elevator an information indicating if this carriage is empty or charged. In fact, a given carriage, bearing for example the serial No. 3, being in setting position, may be considered as occupied if the horizontal platform of the elevator displaces itself downwards, whereas it may be considered as free if this platform displaces itself upwards. In fact, a downward displacement of this horizontal platform corresponds to the storing of a car thus to the setting of said car on the selected carriage, whereas an upward movement of said platform corresponds to the withdrawal of a car.

The operation of the storing installation described is according to the following:

When the storing installation is at rest, that is to say when no storing or withdrawal operations of a vehicle is effected, all the free spaces $7a$ are situated in front of the elevator and the lines of carriages are locked in that position by means of the locking devices. Further in rest position of the installation the toothed elements 40 of one of the platforms of the elevator are situated at level 37 and the elevator is stopped. Further in this rest position of the installation, the doors 51 are in opened position and the mobile plate 53 is in active position.

When one wants to store an automobile, the following operations are effected:

(1) The vehicle being on the access surface 52 moves in the direction of the arrow *f* and is placed on the platform of the elevator. The vehicle rests by means of two wheels on each of the toothed elements 40. The driver gets out of the car and goes back to the access surface.

(2) With the aid of the security device, the operator chooses a free carriage then he exerts a thrust on the push-button P corresponding to this carriage which provides in the manner described hereinbefore the automatic setting in setting position of the chosen carriage and the setting in rest position of the lines of carriages which do not comprise the said chosen carriage.

(1) The operator shuts the door 51 and displaces the mobile plate 53 until its inactive position is reached, then sets the motor 31 into operation. The platform carrying the car moves downwards.

(4) In the course of the downward movement of said platform, the car is laid on the free carriage 7 which has already been set in setting position. In fact, the teeth of the toothed elements 40 of the platform pass through the teeth of the supports 9, whereas the car rests on the toothed supports 9.

(5) The elevator continues its travel until the platform having carried the vehicle arrives at the end of the stroke. For that position, the second platform is located in the upper position, that is to say in position to receive another vehicle. The doors 51 are again opened whereas the mobile plate 53 is displaced in order to shut the apertures 55.

When one desires to proceed to the withdrawal of a car stored in the installation, the following operations are necessary:

(1) The operator shuts the door 51 and displaces the mobile plate 53 so as to free the apertures 55.

(2) Due to the security device, the carriage carrying the car that has to be withdrawn out of the parking position, is placed in setting position and the lines of carriages which do not comprise this carriage are placed in rest position in the manner described hereinbefore.

(3) The elevator is moved in the upward direction. The platform located in the lower position moves upwards. In the course of their upward displacement, the toothed elements 40 pass through the teeth of the supports 9 of the carriage, placed in setting position and carrying the car. The car is taken off by the platform of the elevator until the upper level is reached, and the elevator stops when the platform carrying the car is located in the upper position.

(4) The doors 51 open and the mobile plate 53 is placed in active position, then the car may be moved out on the rolling surface 52.

It is evident that several of the operations of the storing cycle or of the withdrawal cycle of a car might be effected simultaneously as long as they are synchronized so as to ensure the good working of the whole installation. In this latter case, it is preferable to foresee a full automatic control in order to obviate any wrong handling.

For the sake of indication, it is possible to give certain practical indications of a storing installation according to the invention.

An installation comprising a trench of an average diameter of about thirty meters and comprising five floors enables the storing of approximately 200 cars. The area for each car is of the order of 24 $m.^3$. The maximum time for the withdrawal of a car, assuming that the car is located at the lower floor and diametrically opposite to the elevator, is of the order of 55 seconds. The average time necessary for withdrawing a car is of the order of 20 to 30 seconds.

It is evident that in order to increase the capacity of the installation and the rapidity of the setting and withdrawal operations of the cars, it is possible to foresee several concentric installations. The storing capacity of the total installation is then sensibly equal to the capacity of a partial installation multiplied by the number of these partial installations, whereas the average time necessary for a storing or withdrawal operation of a car is approximately equal to the time for a partial installation divided by the number of these partial installations. One obtains thus times which are less than 10 seconds for the storing or the withdrawal of a car which enable the overcoming of the rush hours.

Further it is to be noted that such installations are specially advantageous for underground parking. In fact, this enables a continuous running of the elevator and thus an appreciable saving of time. In all cases, it is necessary that the access device be located on top of the storing device in order that the continuous movement elevator be efficiently utilized and brings advantages with respect to the elevator of the reciprocation type.

On the other hand, only one fixed elevator enables the storing and the withdrawal of all the cars located in a storing device, which reduces in a great measure the cost of the installation with respect to the installation using a movable elevator or several elevators.

In an installation which comprises several concentric storing devices, it is possible to keep the storing device presenting the lesser diameter for little cars whereas the storing devices of great diameter can be foreseen for larger automobiles. It is thus possible to have in all the storing devices approximately the same number of cars.

The second embodiment illustrates in FIGS. 10 and 11 differentiates itself from the first one by the fact that the cars are no longer disposed longitudinally in the storing device but radially. This has for consequence to modify the outlook of the toothed supports 9 carried by the carriages 7 and of the toothed elements 40 forming the platforms of the elevator. FIGS. 10 and 11 show two variants of possible shapes for these toothed supports 9 and these toothed elements 40.

The operation of this second embodiment of the installation is identical to the one described in reference to the first embodiment.

In another variation, each toothed element of the elevator could be carried by only one lateral bearing column.

The two embodiments described and illustrated until now present certain advantages with respect to the existing installations of which the principal advantages are the following:

(1) For a given storing capacity, the encumbrance may be reduced in great proportions (1 to 2 or 3). Further, all the spaces comprised inside the periphery of the trench 6 stay free from the construction of cellers or any other desired installations. Inside the trench 6 there is less lost room since one uses carriages the length of which is approximately the one of the cars and that no room has to be utilized for the circulation of the vehicles.

(2) The rapidity of the storing or of the withdrawal of a car is much higher than the one of the existing installations. In fact, the number of necessary operations (permutation or rocking of vehicles) is reduced to the strict minimum.

It is evident that numerous variations of these two embodiments may be foreseen without departing from the scope of the present invention. Particularly, the shape of the closed circuit could be non-circular, for example oval, eliptical or presenting any other shape, so long as the rollway constitutes a closed circuit and does not present any intersection with itself. Further, the shape of the toothed supports and of the toothed elements could be different so long as the desired aim is obtained.

In a non-illustrated variation of these two first embodiments the storing device would not present carriages properly speaking. The rails would carry then directly the toothed supports and these rails would rest on wheels pivoted on the beams 4 so that they would be angularly displaceable. In this case, these rails could comprise a solution of continuity the length of which could be equal to the one of a support and would correspond to the free space described in reference to the two embodiments described.

In another variation, it is evident that the installation could be disposed inside a square or rectangular room. The rollway would then be fixed to a metallic framing constituting the frame of the whole installation.

The installation could also be outside. However, in this case, it would be necessary to use access benches in order to get to the access device, this one being necessarily located on top of the storing device.

Figure 15:
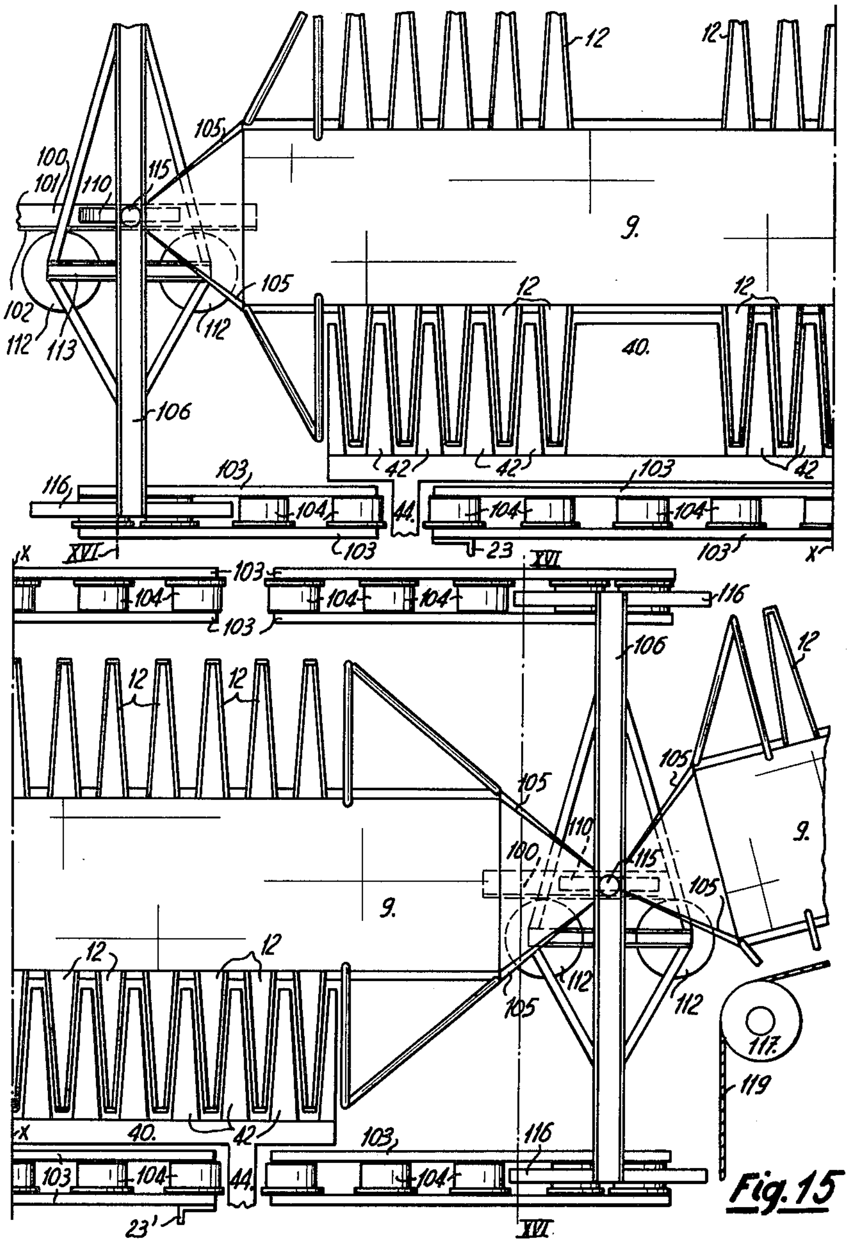
FIG. 15 is a partial top view of the setting device and storing device of a third embodiment of the installation.
Figure 17:
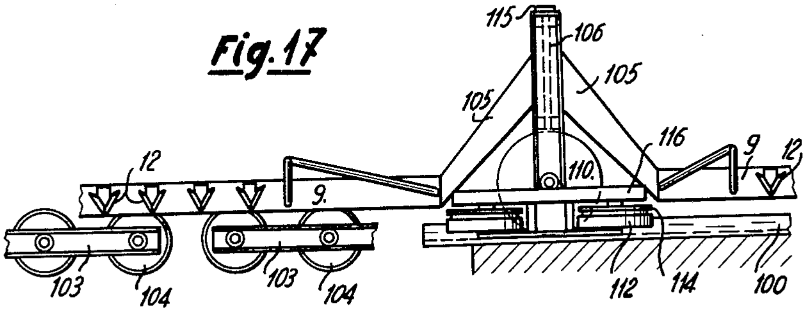
FIG. 17 is a partial side view of the storing device.
Figure 16:
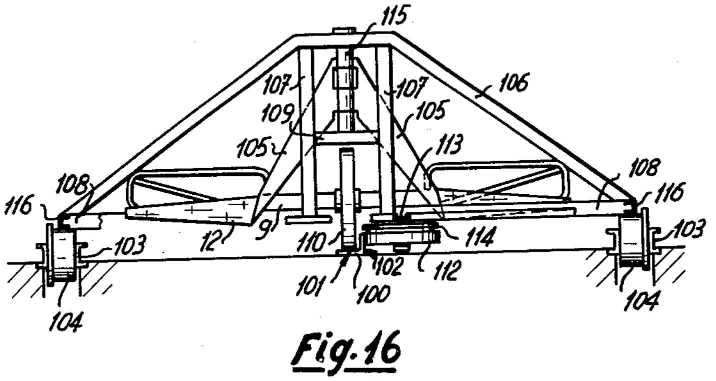
FIG. 16 is a cross section along line XVI—XVI of FIG. 15.

The third embodiment partially illustrated at FIGS. 15 to 17 comprises a setting device practically identical to the one of the first embodiment. Only the shape of the teeth 42 of the elements 40 is somewhat different. In fact, in this third embodiment these teeth 42 present, in top view, a general trapezoidal shape the great base of which is rigidly connected to the elements 40. Further these teeth 42 present, in side view, also a general trapezoidal shape so that the general configuration of these teeth is a triangular pyramid, the base of which is rigidly fixed to the element 40. This shape of the teeth is very advantageous since it constitutes a triangulated beam approaching a shape giving a linear distribution of the bending stresses.

Also, in this third embodiment, the storing device comprises oval, closed rollways, wherein one is disposed below or above the other, thereby presenting two circular portions at each extremity connected through rectilinear portions. Here also, the periphery of the rollways is such that a whole number of carriages 7 may be placed on these.

Each of these rollways being constituted by a central monorail 100 constituted by a right angle iron, each wing of which 101, 102 constitutes a rolling surface. This central monorail 100 is maintained in its location, laterally and vertically by means of any adequate structure, metallic or other.

This monorail 100 is interrupted in one of its rectilinear portions on a distance equal at least to the length of a toothed support 9 carried by a carriage 7. On this distance at least, corresponding to the location of the setting device, the rollway is constituted by series of rollers 104 disposed on either side of the trench 6 pivoted on supports 103 rigidly fastened on the wall 5 of the said trench. These supports 103 are interrupted in two places in order to give passage to the mounting arms 44 of the elements 40 of the setting device.

The line of carriage 7 moving along this rollway is constituted by toothed supports 9 comprising teeth 12 presenting the same shape than the teeth 42 of the elemens 40 and adapted to give passage to these latters during the upward or downward displacements of the platforms of the elevator. These supports 9 are connected at each of their ends by the intermediary of arms 105 fast with these supports 9 to a bogie or movable member.

Each of these bogies is constituted by a top beam 106 presenting the general shape of an inverted V, two vertical props 107 rigidly fixed on the top part of the beam 106 and respectively connected at each extremity of it by means of cross beams 108. A spacer 109 connects rigidly the two vertical props 107 approximately at half height of them. The frame thus constituted is disposed in a plan perpendicular to the monorail 100. A roller 110 pivoted on an horizontal axis 111 rigidly connected to the props 107 rolls on the wing 101 of the monorail 100. This bogie comprises further two driving rollers 112 pivoted on a support 113 rigidly connected to the cross beams 108 situated toward the outside of the rollway. These driving rollers present a groove 114 intended to receive a rope or cable of a driving device of the line of carriage 7 and rolls on the external surface of the wing 102 of the monorail 100.

The arms 105 of two successive supports are pivoted through their free extremity on a shaft 115 vertically fixed between the spacer 109 and the top of beam 106.

Due to the fact that the resting point of the supports on the bogie is high and that the successive supports 9 form an angle between them, the lateral stability of these supports is ensured.

The external extremities of each cross-beam 108 are provided with shoes 116 intended to roll on the rollers 104 during their passage in front of the elevator where the monorail is interrupted.

As a result of the length of these shoes 116, the passage of the bogie from the monorail 100 onto the series of rollers 104 and vice versa, is smoothly effected.

The pyramidal shape of the teeth of the elements 40 of the elevator as well as those of the supports 9 ensures an increased working security. In fact, whatever the direction of the displacement of the elements 40 of the platform of the elevator is, the teeth of these engage between two lateral walls of two adjacent teeth of the supports 9 forming a passage presenting a large opening and then getting smaller. In this way, if the carriage in setting position is not positioned with sufficient precision, the teeth of the elements 40 may however engage in said passage and bring about, by entering in contact with the teeth of the supports 9, a slight displacement of this support which enables the normal operation of the installation.

It is evident that in this embodiment also the number of carriages is equal to the maximum possible number less one for each rollway.

In this embodiment, it is further possible to reduce the encumbrance of the elevator; this one being placed in a rectilinear portion of the rollway which diminishes its width due to the absence of curvature.

The driving device of each line of carriages into rotation could be of the same type as the one used in the first embodiment, however a type of driving device specially well adapted for this third embodiment will be described.

This driving device comprises a supple member 119, for example a rope or cable, a timing belt, etc., located in the grooves 114 of all the driving rollers 112 of the bogies placed on curved portions of the rollways.

Deviation rollers 117, pivoted on a fixed part of the installation, are disposed at each extremity of the rectilinear portions of the rollways. On the side where the elevator is located, a second pair of rollers 118 is provided so that the supple member 119 can be deviated outside said elevator. A stretcher pulley 120 located on the rectilinear portion of the rollway is located opposite the elevator and pulls the supple member towards the outside which enables the maintaining of a desired tension in said supple member 119 necessitated for the driving in rotation of the line of carriages 7. On the rectilinear portion of the rollway and disposed outside of the elevator is located a driving motor 121 actuating a driving pulley 122 surrounded by the supple member and driving same.

When the motor 121 is energized it drives the supple member 119 which presses the driving rollers 112 against the wing 102 of the monorail 100 and drives these ones in rotation thereby providing the driving of the line of carriages along the rollway.

This driving is specially advantageous due to the fact that on the one hand there is practically no sliding between the supple member and the different rollers, which permits reducing the wear of these elements to very low values, and on the other hand that the greater part of the bogies are individually driven, which hinders the creation of big traction efforts in the line of carriages and ensures a much more regular and precise operation.

The control of this third embodiment of the installation may be semi-automatic or entirely automatic. This control may be effected for example in a similar way as the one described with reference to the first embodiment but could naturally be different. However, the realization of such an automatic control stay in the reach of the men skilled in the art and will then not be described here in detail.

During the rotation of the line of carriages its length varies periodically between two limits due to the passage of the carriages from the circular portion to the rectilinear portion and vice versa. For that reason only the driving rollers of the bogies located on the circular portions are in contact with the supple member, so that it is possible to hinder any sliding of said supple member with respect to the said rollers which reduces greatly the wear of these elements.

Figures 18, 19, 20:
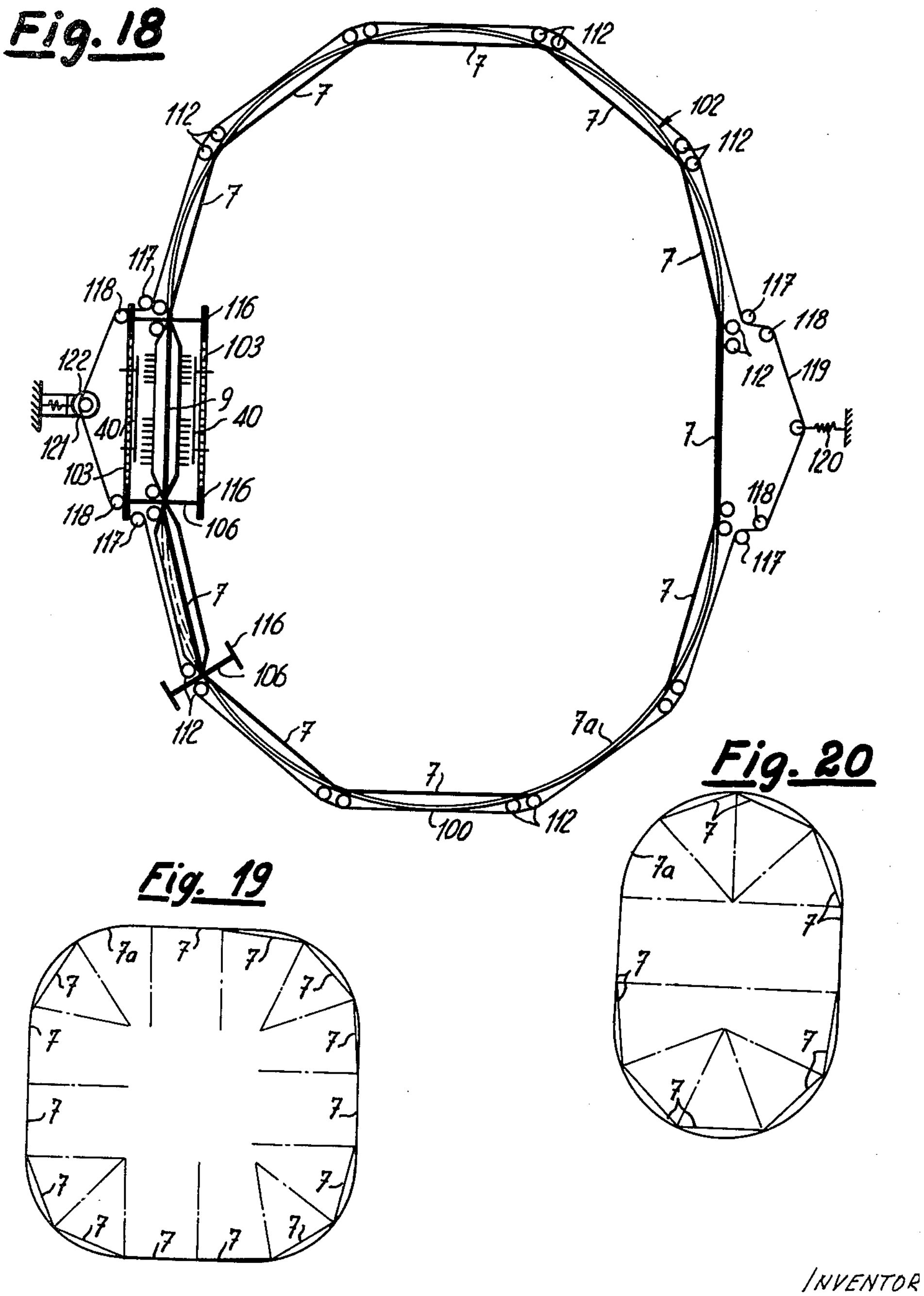
FIG. 18 illustrates schematically and in plan view a device for driving in rotation the carriages of the storing device of the third embodiment of the installation.
FIGS. 19 and 20 illustrate two particularly interesting shapes of the rollway of the storing device.

In order to reduce this length variations upon rotation of the lines of carriage shapes and dimensions of particular interest of the rollways have been elaborated. FIGS. 19 and 20 show two specially advantageous configurations, enabling reducing the length variations to a value less than 10 millimetres.

The dimensions of the rollway illustrated in FIG. 20 are the following:

| | Meters |
|---|---|
| Radius of the rail | 6.794 |
| Length of a support | 5.20 |

In using an uneven number of places (carriages+free space), it is possible to show that the maximum length variation in the course of the rotation of the line of carriages is about 0.72 cm.

Whereas the dimensions of the rollway illustrated in FIG. 19 are:

| | Meters |
|---|---|
| Radius of the arcs of circles | 6.794 |
| Length of a support | 5.20 |

In using also an uneven number of places one shows that the maximum length variation of the line of carriages is in this case about 0.08 cm.

In both cases mentioned above, one would have double differences using an even number of places for the lines of carriages.

One sees however that these length variations are little in the above mentioned cases and that they may be absorbed by the existing mechanical clearances in the connections of the carriages between themselves in the case where a mechanical driving (rack or other) of the line of carriages would be used.

The operation of this third embodiment is identical to the one of the first embodiment described and will thus not be repeated again.

It is evident that numerous variations may come to mind, particularly the shape and dimensions of the rollways could be different. These depend in great measure upon the available space for lodging the storing installation.

Further the length of the free space of each line of supports could be different from that of a carriage so long as this length is longer or equal to that of a support.

Further the rope driving device seems to be the most advantageous, as well from the technical as from the economical point of view. It is evident that other driving devices of the different lines of carriages could be utilized.

Furthermore the driving device using a supple member is susceptible to be modified. Particularly in the case of an installation comprising rollways presenting more than two rectilinear portions, the driving devices could present a stretcher pulley for the supple member disposed approximately in the middle of each of the rectilinear portions. Further the driving pulley mechanically connected to the driving motor could also constitute a stretcher pulley for the supple member.

Although the described storing installations are specially well adapted for the storing or the parking of vehicles, it is evident that other goods could be stocked with the aid of such installations.

A particular application of such a storing installation is the realization of a strong room for the banks in particular. In fact each carriage may carry one or several safes. In such an installation it suffices to guard the access of the elevator which may be located inside a little strong-room.

The survey of such as installation is greatly simplified, in fact only the access to the elevator has to be guarded, nobody being able to enter into the storing device. Further in addition to the combination of a particular safe, its owner has to know its co-ordinate, that is to say the floor and the serial number of the carriage on which it is located so that a supplementary security is introduced.

In addition to the advantages directed to the installation, so as to the rapidity of storage and withdrawal of a load, the installation also presents further the following advantages with respect to the existing storing installations:

(1) As the storing installation is entirely mechanical, the cars are never started inside the storing device. It is thus not necessary to provide any ventilation of this device, which enable reducing the operating expenses of such an installation.

(2) For the same reasons, it is not necessary to provide lighting of the storing device. In all the installations where the drivers place themselves in their cars, it is evident that lighting has to be provided and minutely studied, so as to reduce the risk of accidents. Here also, the absence of lighting contributes to reduce the cost and the operation expenses of such an installation.

(3) The risk of accident, that two cars enter in collision, inside the storing device, is practically nil, each car being placed on a support. It is thus possible to obtain special conditions from the insurance companies to cover the risks of such installations. This enable also a reduction of the operating expenses of the installation.

(4) The height between two rollways located immediately one on top of the other may be greatly reduced. In fact, it is not necessary to provide a height sufficient for the passage of persons, only the cars or goods need to be transported on these rollways. This enables increasing the storage capacity for a given volume and thus to diminish the net cost of a storing installation.

In another embodiment, non-illustrated, a same elevator could serve two concentric independent rollways. In such an embodiment, each of the elements 40 of a same platform of the elevator would pass during their upward or downward movement between the teeth of the supports of two different rollways. Further, the length of each platform element could be of twice a length as that of the supports so that the content of two supports is, either stored or withdrawn simultaneously.

In these conditions, a platform, that has two elements 40, is adapted to place or withdraw the object laid on four adjacent supports, two on each rollway.

In setting independently the one from the other the lines of carriages or of supports, it is possible to store and withdraw a very diversified assortment of objects.

Such a realization may be very advantageous for a "self service" restaurant. In fact, each customer may, with the aid of a bill of fare, prepare a menu and then in setting adequately the two lines of carriages, withdraw with the aid of the lift, four plates, that is a complete menu, at one time.

I claim:

1. In a storing installation, an elevator comprising at least one setting platform vertically displaceable in a shaftway of said elevator; at least two circuitous rollways each defining substantially horizontal paths of movement and each being substantially vertically aligned one with respect to the other; said elevator's shaftway orthogonally intersecting said rollways; a series of supports resting on each of said rollways, at least one free space between the ends of two adjacent supports of a length at least equal to the length of one of said supports; mechanical linkages connecting each support to at least one other support of the same series of supports, driving means for each of said series of supports for displacing said supports along said rollways; locking means associated with each of said rollways to retain said series of supports in a selected position whereby either a support or a free space thereof is in said elevator's shaftway prior to arrival of said setting platform; control means controlling both said driving means and said locking means so that at the same time only one of said series of supports is locked with a support thereof in said shaftway whereas all other series of supports are locked with their free spaces in said shaftway; said setting platform passing, when all said series of supports are locked in one of said selected positions, through said selected support and said selected free spaces during its vertical working displacement in said shaftway.

2. A storing installation as claimed in claim 1 in which the number of supports of each series of supports is equal to the maximum possible less one thus providing for said free space and in which both said platform and said supports are provided with laterally extending fingers constituting a loading surface.

3. A storage installation as claimed in claim 1 in which each support of said series of supports comprises at least one driving roller in contact with the corresponding rollway and in which said driving means of each said series of supports comprises an endless and supple member pressing all said driving rollers against the rollway, and a driving motor driving the endless member to move the supports along said rollway.

4. A storing installation as claimed in claim 3 in which each of said rollways comprises a central monorail extending the whole length of the horizontal path of movement for said series of supports except in the location of the shaftway of the elevator, said rollway being constituted over the length of said path of movement crossing said shaftway by means of supporting members, and shoes fixedly secured to said supports and cooperating with said supporting members when a support crosses said shaftway.

5. A storing device as claimed in claim 1 in which said elevator comprises at least two bearing columns, one endless element associated with each said columns and passing over wheels pivoted on each of said columns, said columns and said endless elements extending along the whole height of said shaftway of said elevator, and arms connecting said setting platform to each of said endless elements.

6. A storing device as claimed in claim 5 in which said elevator further comprises guiding means, rollers pivoted on the free end of said arms coacting with said guiding means to maintain said setting platform in horizontal position within said shaftway during its vertical working displacement.

7. A storing device as claimed in claim 6 in which said guiding means includes other means for causing the tilting of said setting platform from its horizontal position during its working displacement to a vertical position for its non-working displacement, said platform being located for its working displacement inside said rollways and for its return displacement outside said rollways.

8. In a storage device as claimed in claim 1, in which an access device is situated on top of the storage device adjacent the setting platform.

References Cited by the Examiner

UNITED STATES PATENTS

| | | | |
|---|---|---|---|
| 835,312 | 11/06 | McNabb | 198—163 |
| 995,648 | 6/11 | Wright | 104—25 |
| 1,613,213 | 1/27 | Wilde | 214—16.11 |
| 1,615,237 | 1/27 | Schwartz | 198—156 |
| 2,014,351 | 9/35 | Becker. | |
| 2,028,476 | 1/36 | Rome et al. | |
| 2,626,040 | 1/53 | Lamb | 198—163 |
| 3,054,518 | 9/62 | Coursey. | |

FOREIGN PATENTS

| | | |
|---|---|---|
| 1,099,082 | 8/55 | France. |
| 1,061,502 | 7/59 | Germany. |

GERALD M. FORLENZA, *Primary Examiner.*

HUGO O. SCHULZ, *Examiner.*